May 6, 1958
P. E. BESSIERE
2,833,945
FOUCAULT CURRENT APPARATUS AND ESPECIALLY BRAKING APPARATUS
Filed March 30, 1955
8 Sheets-Sheet 1
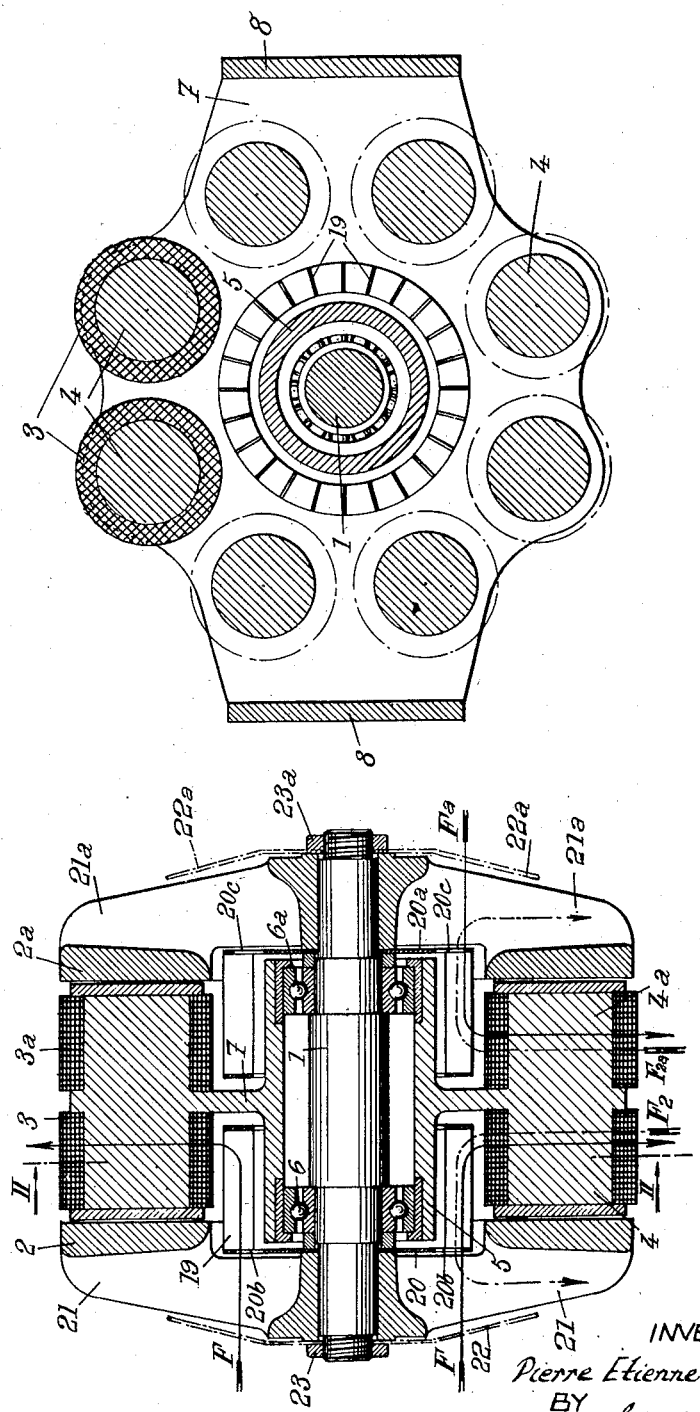
INVENTOR
Pierre Etienne Bessiere
BY
Bailey, Stephens and Huettig
ATTORNEYS INVENTOR
Pierre Etienne Bessiere
BY
Bailey, Stephens and Huettig
ATTORNEYS May 6, 1958
P. E. BESSIERE
2,833,945
FOUCAULT CURRENT APPARATUS AND
ESPECIALLY BRAKING APPARATUS
Filed March 30, 1955
8 Sheets-Sheet 3
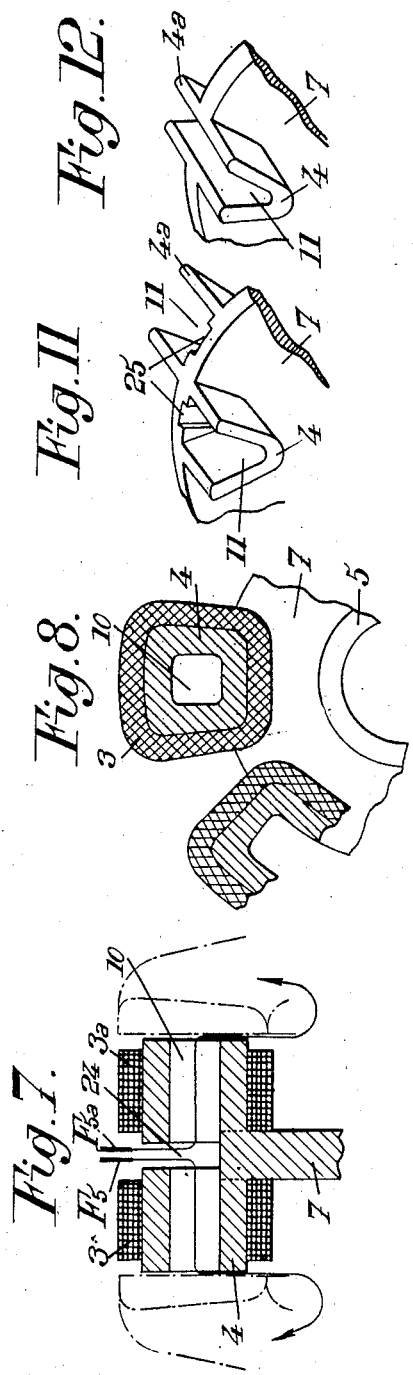
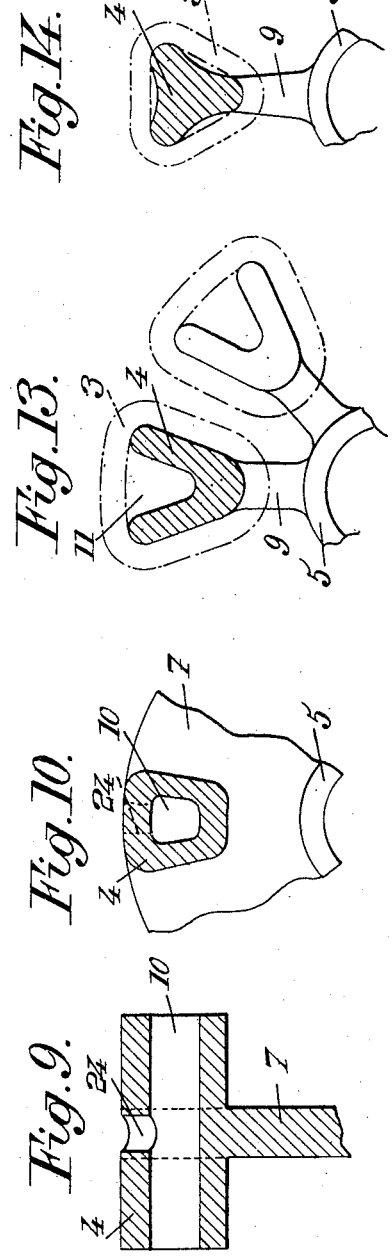
INVENTOR
Pierre Etienne Bessiere
BY
Bailey, Stephens and Huettig
ATTORNEYS

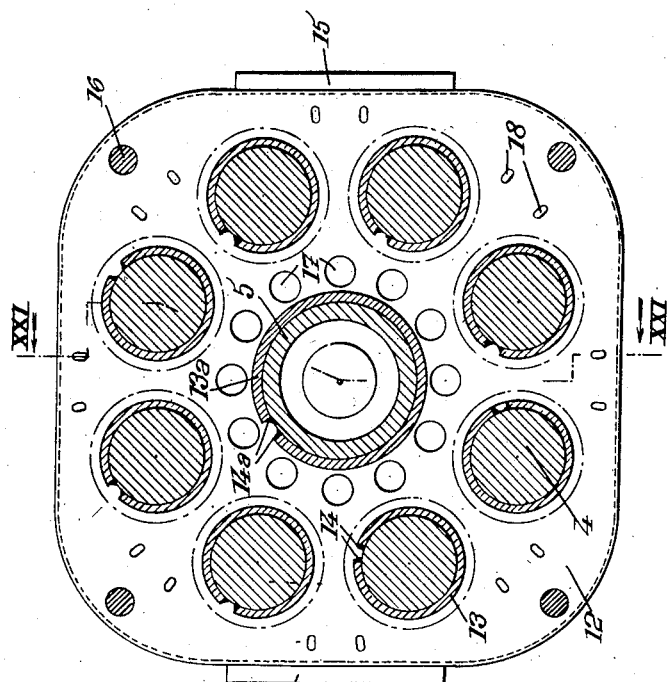
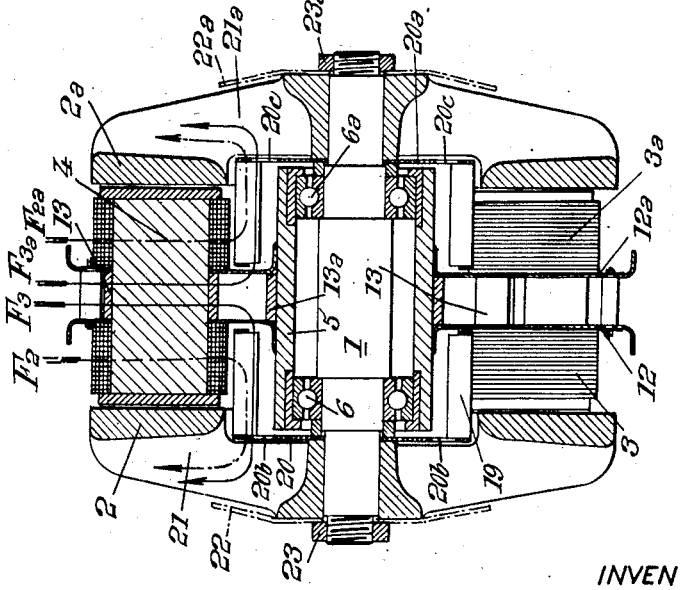

May 6, 1958  P. E. BESSIERE  2,833,945
FOUCAULT CURRENT APPARATUS AND
ESPECIALLY BRAKING APPARATUS
Filed March 30, 1955  8 Sheets-Sheet 6
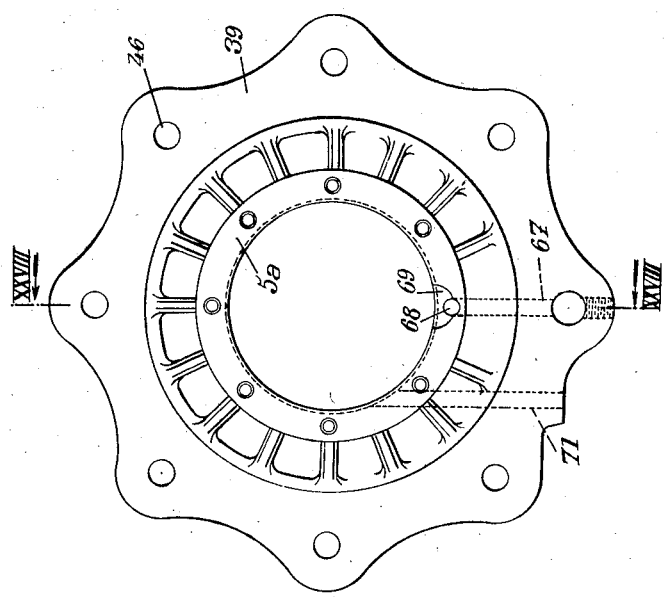
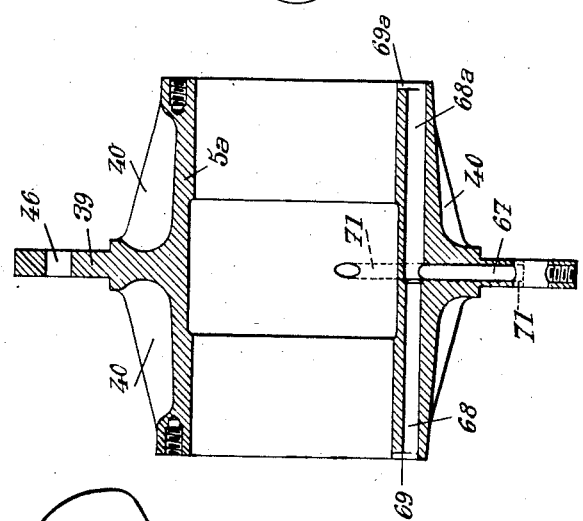
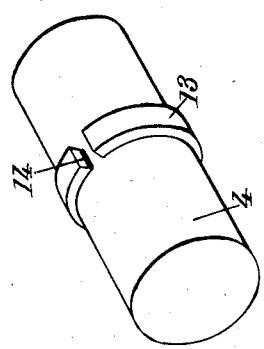
INVENTOR
Pierre Etienne Bessiere
BY
Bailey, Stephens and Huettig
ATTORNEYS

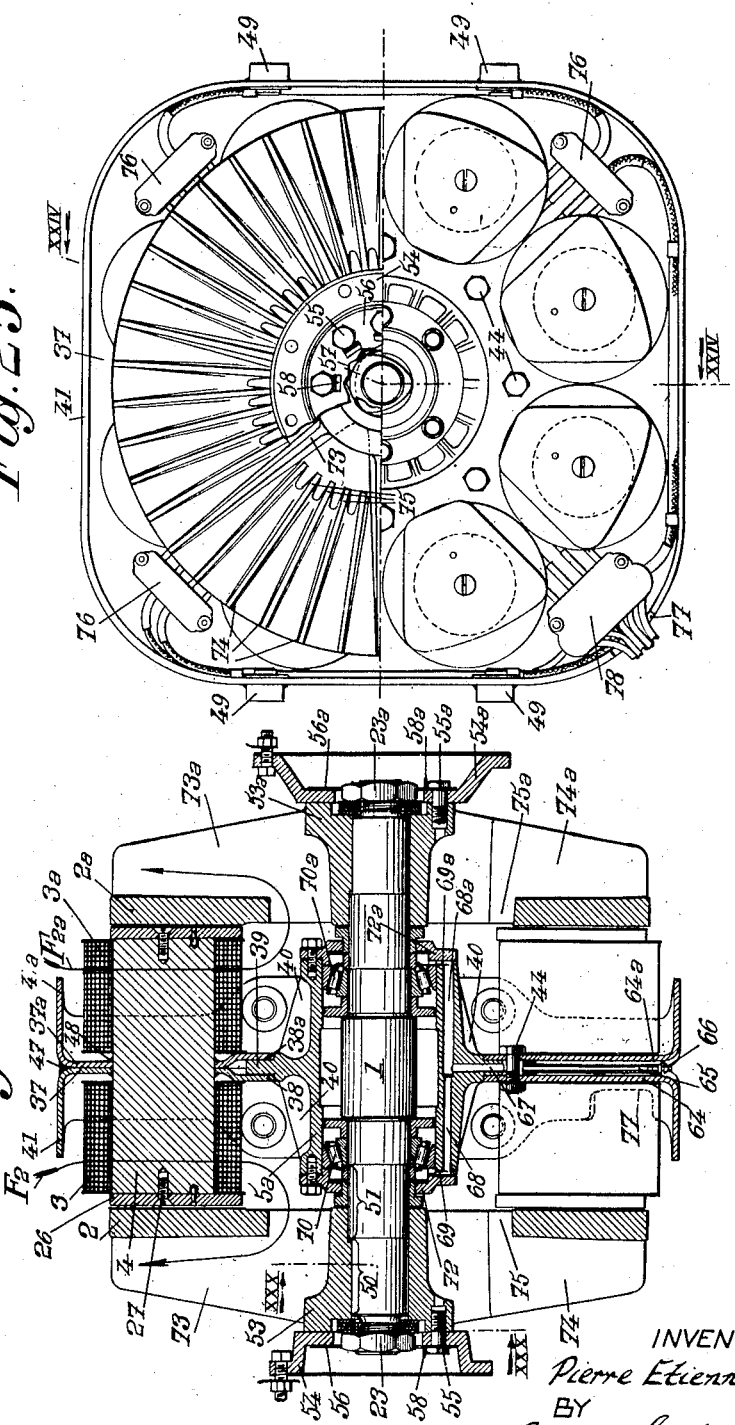

May 6, 1958
P. E. BESSIERE
2,833,945
FOUCAULT CURRENT APPARATUS AND
ESPECIALLY BRAKING APPARATUS
Filed March 30, 1955
8 Sheets-Sheet 8
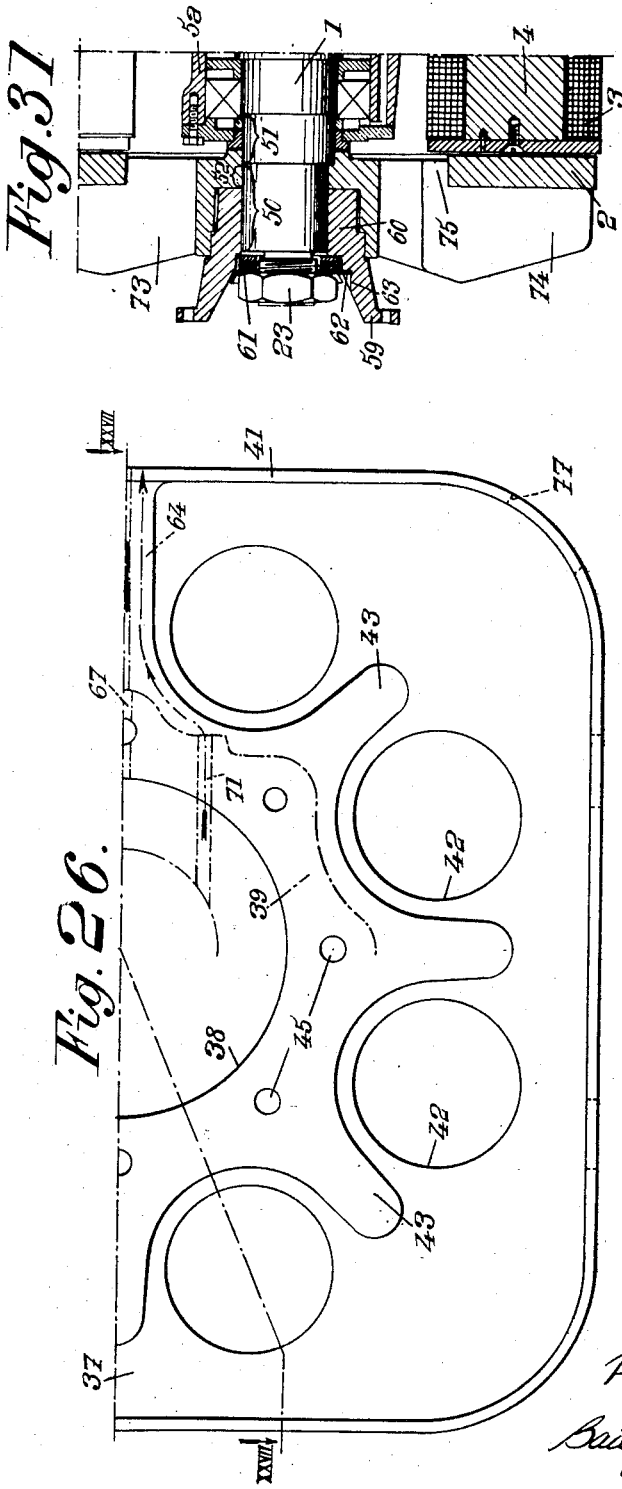
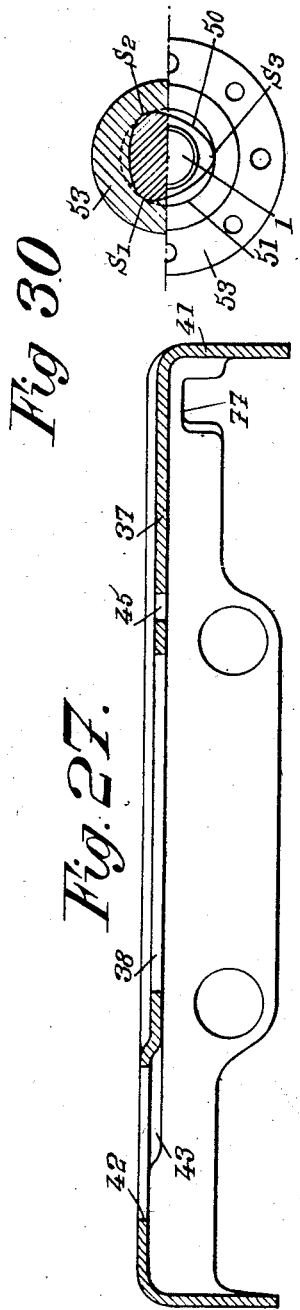
INVENTOR
Pierre Etienne Bessiere
BY
Bailey, Stephens and Huettig
ATTORNEYS

United States Patent Office 2,833,945
Patented May 6, 1958

2,833,945

FOUCAULT CURRENT APPARATUS AND ESPECIALLY BRAKING APPARATUS

Pierre Etienne Bessiere, Paris, France, assignor to Telma, Paris, France, a French society Application March 30, 1955, Serial No. 497,984

Claims priority, application France April 5, 1954

16 Claims. (Cl. 310—93)

The present invention relates to Foucault current apparatus and it is more especially but not exclusively concerned with such apparatus used for braking or slowing down purposes. Such apparatus generally include a stator provided with at least one electro-magnet which, when it is energized, produces a magnetic field in which is located a rotor carrying an armature and rigid with a shaft to be braked, said rotor being constituted by at least one disc and the inductor stator being located on one side of said disc. Foucault currents are therefore produced in the disc rotating together with the shaft and these Foucault currents exert a braking action on said shaft while causing an intensive disengagement of heat which is transmitted to at least some parts of the stator which must therefore be strongly cooled, together with the rotor.

The chief object of the present invention is to provide an apparatus of this kind which is better adapted to meet the requirements of practice, especially concerning simplicity of manufacture, arrangement of the stator, and efficiency of cooling.

In such an apparatus, the rotor is constituted by two parallel discs fixed at a distance from each other along the apparatus shaft, and the inductor includes a plurality of electro-magnets located in the space between said two discs, and according to the present invention, the cores of said electro-magnets are carried by a common support such that said cores, projecting on either side of said support, form two annular rows in the interval provided between the two rotor discs, this support including, rigid therewith, a central sleeve which forms a bearing for the apparatus shaft coaxial with said two rows of cores, suitable means being provided to circulate cooling air in the interval between said cores and said sleeve.

Preferred embodiments of the present invention will be hereinafter described with reference to the accompanying drawings given merely by way of example and in which:

Fig. 1 is an axial sectional view of a braking device made according to the invention.

Fig. 2 is a section on the line II—II of Fig. 1.

Figs. 7 and 8 are an axial sectional view and a transverse sectional view of portions of braking devices made according to a modification.

Figs. 9 and 10 are views similar to Figs. 7 and 8 and relating to another modification.

Figs. 11 and 12 are perspective views of portions of stators made according to two other modifications.

Figs. 13, 14 and 15 are end views of portions of stators made according to three other modifications.

Figs. 21 and 22 are views analogous to Figs. 1 and 2 and relating to another embodiment of the invention.

Fig. 23 is a perspective view showing a detail of the structure of Figs. 21 and 22.

Figs. 24 and 25 show respectively in axial section and in end view with some parts in section, a braking device according to a modification.

Fig. 26 shows on an enlarged scale and in elevational view one half of a supporting element of the braking apparatus of Figs. 24 and 25.

Fig. 27 is a sectional view corresponding to Fig. 26.

Figs. 28 and 29 show, also on an enlarged scale, and respectively in axial section and in end view, the central sleeve of the apparatus of Figs. 24 and 25.

Fig. 30 is a sectional view on the line XXX—XXX of Fig. 24.

Fig. 31 is a part sectional view analogous to that of Fig. 24, but relating to a modification.

Figure 4:
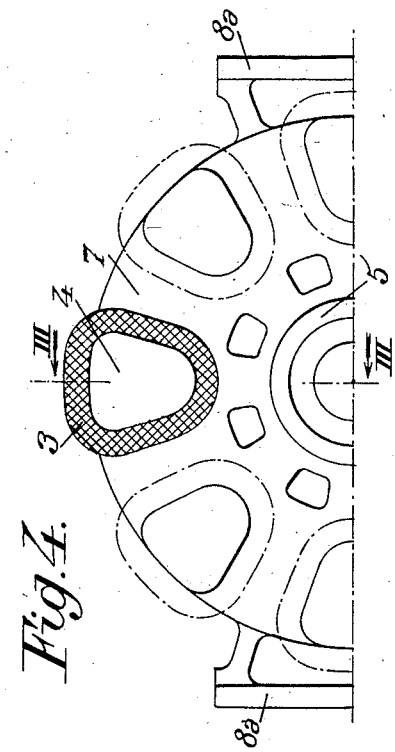
Figs. 3 and 4 are respectively an axial half-section and a transverse half-section of another embodiment of the invention.
Figure 6:
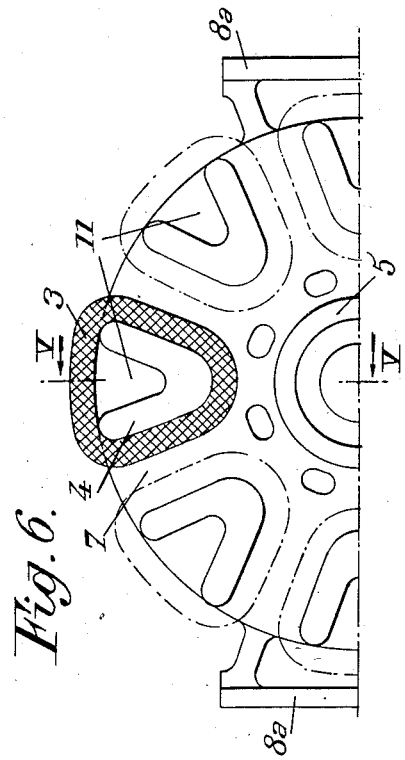
Figs. 5 and 6 are views similar to Figs. 3 and 4 and relating to still another embodiment.
Figure 3:
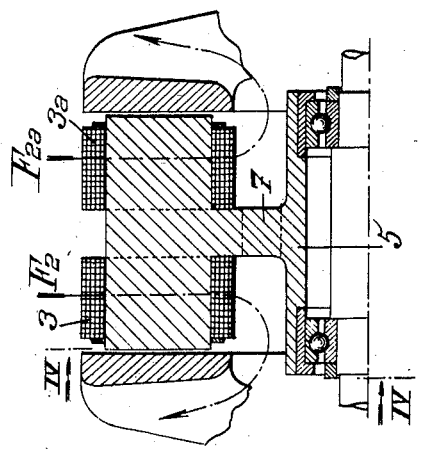

In the examples illustrated by the drawings, the rotor is constituted by two parallel discs 2 and 2a located at some distance from each other along the shaft 1 to be braked. In the space between said discs 2 and 2a are disposed the inductor electro-magnets 3, 3a which, together with the bearing of shaft 1, belong to the stator of the apparatus.

According to the invention, the cores 4, 4a of the electro-magnets are carried by a common support and project on either side of said support so as to form respectively two circular rows in the intervals existing between this support and discs 2 and 2a. Said support further carries a central sleeve 5 in which shaft 1 is journalled, for instance by means of ball bearings 6 and 6a. Cores 4 and 4a have their axes parallel to shaft 1 and preferably all these axes are at the same distance from said shaft.

According to a first embodiment, the two rows of cores 4 and 4a, sleeve 5 and the support form a single unit, and this unit is either wholly made of a ferro-magnetic material by molding, or is obtained by casting around cores made of a ferro-magnetic material, and preferably constituted by soft iron drawn bars, the support and the sleeve being advantageously made of a light alloy.

Figure 15:
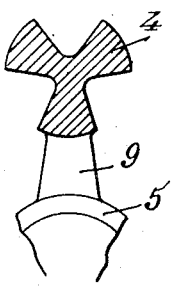

Preferably the support itself is located in the transverse plane of symmetry of the brake and it may be constituted either by a plate 7, as shown in Figs. 1 to 12, inclusive; or by a plurality of rays 9 extending from central sleeve 5 to the electro-magnet cores, as shown in Figs. 13 to 15 inclusive.

In both cases, said support is rigid with fixation parts 8 (Fig. 2) or 8a (Figs. 4 and 6) or 15 (Fig. 22) for fixation of the whole of the apparatus to the frame of a vehicle or to a fixed frame.

When the support, the sleeve and the cores are obtained by molding in a single piece and are made of a magnetic material, this piece should be given substantially the same thickness everywhere, in order to prevent internal strains from being produced in this piece during its solidification and cooling in the mold.

For this purpose it is advantageous to make use of hollow cores which may be either tubular so as to form therein a conduit 10 (as shown on Figs. 7 to 10, 19 and 20); or gutter-shaped with a V- or U-section the branches of which extend toward the periphery of the apparatus and form conduits 11 in electro-magnets 3, 3a (as shown on Figs. 5 and 6 and 11 to 13 inclusive); or again of any other suitable shape, for instance of Y-section or of the shape illustrated by Figs. 14 and 15, or of star or analogous shape.

Such a stator is strong, light and cheap to manufacture.

According to another embodiment of the invention, illustrated by Figs. 21 and 22, a stator having analogous advantages is obtained by constituting the support by two symmetrical and parallel plates 12 and 12a, obtained from steel sheets cut and shaped in a single operation. Simultaneously, a plurality of holes are formed in said plates, for instance a central aperture for fixation of the central sleeve therein and, around said aperture, a plurality of apertures for inserting therein the cores of the electromagnets.

These cores are preferably cut from soft steel drawn sections. Accordingly, they are very regular in their structure and have a very good permeability to the magnetic flux. Each of these cores 4 is surrounded, as shown by Fig. 23, by a metallic ring 13, of rectangular section and welded on the periphery of the core as shown at 14.

The central sleeve 5 is constituted by a metal tube surrounded by a ring 13a fixed on this tube in the same fashion as the rings 13 are fixed on cores 4.

The two plates 12 and 12a are slipped on sleeve 5 and cores 4 and moved toward each other until they are stopped by the edges of rings 13 and 13a. Said plates 12 and 12a are then welded around cores 4 and sleeve 5 which extend therethrough.

Preferably plates 12 and 12a have a substantially square outline the edge 15 thereof being bent at right angle so as to form a fixation flange. These plates may be further provided with holes adapted to accommodate transverse bars 16 and with holes 17 for the circulation of cooling air around sleeve 5. They are provided with holes 18 for the electric connections of the electro-magnet windings.

According to another feature of the present invention, there is provided in the annular space existing between the shaft and the inductor electro-magnets, a fan 19 (Figs. 1, 2 and 21, 22) fixed either to shaft 1 through a flange 20 provided with holes 20b, 20c for the circulation of air, or directly to discs 2 and 2a (this case being not shown by the drawings).

This fan 19 serves to circulate through the apparatus a cooling air stream, and preferably it cooperates with a second fan formed by blades 21 and 21a rigid with the rays which connect discs 2 and 2a with shaft 1. Advantageously, one of the two above mentioned fans works as an axial fan, its blades being inclined, with respect to shaft 1, along a helix extending around the axis of said shaft and the other fan works as a centrifugal fan, its blades being substantially located in radial planes. The helical inclination of the blades of the axial fan is chosen in a direction such, with reference to the direction of rotation of shaft 1, that the stream produced by this fan is directed toward the blades of the centrifugal fan.

Figure 5:
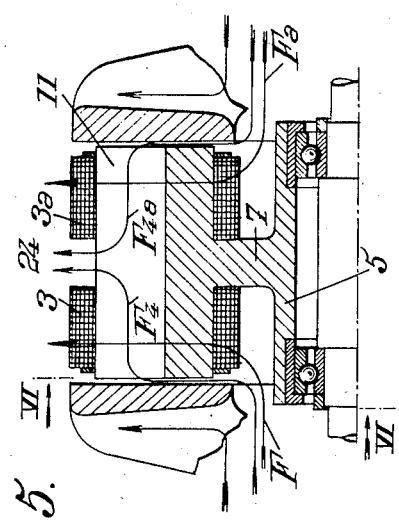

According to a first arrangement, fan 19 is the centrifugal fan which is then fed through holes 20b by the axial fan 21 and discharges this air toward the periphery of the apparatus by circulating it around the electro-magnets so as to cool them down. Circulation of the cooling air then takes place in the direction of arrows F and Fa as indicated by Figs. 1 and 5.

According to another arrangement, fan 19 is the axial fan and fan 21 is the centrifugal fan. This last mentioned fan is then provided with a deflecting plate 22 so that the cooling air streams circulating along arrows $F_2$ and $F_2a$ shown in dotted lines on Figs. 1, 3 and 21, cool down discs 2 and 2a through their external surface.

An advantageous arrangement of the rotor is shown on Figs. 1 and 21 where the inner ring of ball bearings 6, side plate 20, disc 2 and possibly deflecting plate 22 are slipped on each of the ends of shaft 1 and fixed thereon by a single nut 23 (23a) mounted on the screw-threaded end of this shaft.

When the braking apparatus is made as illustrated by Figs. 21 and 22, it is advantageous to use as cooling air inlet the space existing between plates 12 and 12a, this air being sucked in by fan 19 through the holes 17 of plates 12 along a path indicated on the drawing by arrows $F_3$ and $F_3a$ in solid lines and along which path said air stream efficiency cools down the stator and the rotor discs.

When use is made of hollow cores such as above described, through which there is provided, either wholly inside the core or between this core and the electro-magnet winding which surrounds it, a conduit as indicated at 10 or 11 on the drawings, it is advantageous to cause at least a portion of the cooling air streams produced by fan 19 and/or 21 to flow through said conduits in order to improve the cooling of the electro-magnets.

For this purpose, there is provided in the space existing between two corresponding windings 3 and 3a on the periphery of the stator a passage 24 communicating with the conduits 10 and 11 of cores 4 and 4a located on either side of support 7 (or 12, 12a).

In the case of conduits 10 provided inside the cores themselves, this passage 24 is constituted either by a kind of slot as shown on Figs. 7 and 8, when cores 4 project beyond the periphery of support 7, or by mere holes as shown on Figs. 9 and 10, when cores 4 are located on the inside of the periphery of support 7.

If two corresponding cores 4 and 4a form a continuous gutter extending on either side of support 7 and parallel to the shaft (as shown by Fig. 12), a passage analogous to 24 of Fig. 7 is formed by the interval left between the windings formed on cores 4 and 4a. When, on the contrary, the arrangement is such as shown on Fig. 11 where cores 4 and 4a instead of being opposite each other are offset with respect to each other, conduits 11 are connected with the outside at their ends adjacent to support 7 by providing notches 25 in said support, which notches are not obstructed by the winding mounted on each of said cores when said winding is placed in position.

According to the direction of the cooling air stream, air flows through conduits 10 or 11, either in the direction of arrows $F_4$ and $F_4a$ (Fig. 5), the air stream being discharged by fan 19 and/or 21 through conduits 11 to leave them through their common aperture 24; or in the direction of arrows $F_5$ and $F_5a$ (Fig. 7), the air stream being sucked in by fan 19 and/or 21 through aperture 24 so as to leave conduits 10 on either side of support 7.

Windings 3 and 3a may be fixed on their cores by mere tightening thereon or in any other way. In order to obtain a very good and also very simple fixation, according to the present invention, there may be fixed on the free end of each of the cores 4 or 4a after windings 3 or 3a have been arranged thereon, a pole piece extension in the form of a plate 26 fixed on the main pole piece 4 by a screw 27.

Said plate may be circular and in this case screw 27 passes through the centre of the plate.

Figure 16:
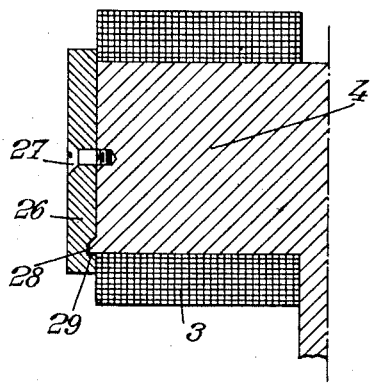
Figs. 16 and 17 are respectively an axial sectional view and an end view of an inductor electro-magnet the core of which is provided with a pole piece made according to the invention.
Figure 17:
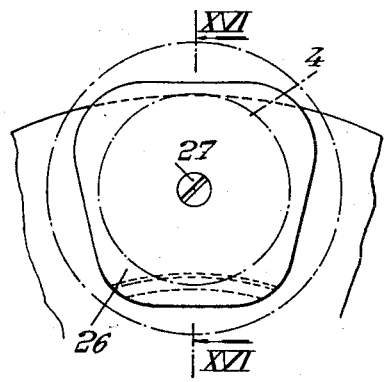
Figure 19:
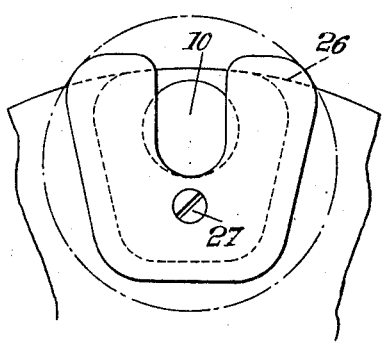
Figure 18:
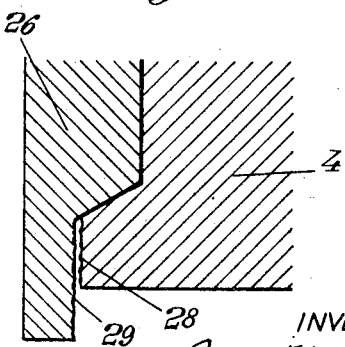
Fig. 18 is a detail view of a core and a pole element made according to a modification of the construction of Figs. 16 and 17.

However it seems more advantageous to give this plate the shape of an isosceles triangle or trapezium, as shown on Figs. 17 and 19 with the apex turned toward shaft 1 so that the equal sides of this plate are directed approximately in the radial direction with respect to said shaft 1. In this case, if a single screw is used for fixation, means must be provided to prevent rotation of the plates about said single fixation screw 27. For this purpose, cores 4 and plates 26 are provided with cooperating projections disposed disymmetrically with respect to the axis of screw 27. In Figs. 16 to 18, projections 28 of core 4 engage recesses 29 provided in plates 26.

Such projections and recesses may be obtained in a very simple maner on a lathe.

When the cores 4 are integral with support 7 and the whole is obtained by molding, it is advantageous to make such projections 28 integral with the molded piece. They are disposed in such manner that their envelope is a body of revolution coaxial with sleeve 5. The surfaces are finished on a lathe by turning the whole of support 7 and cores 4 about the axis of the central sleeve 5.

Concerning the machining of the pole piece extension, it suffices to fix them in a suitable support in the same relative position as they must occupy on the braking apparatus and to mount this support on a lathe by rotating it about the centre of symmetry of the whole, the recesses being obtained so as to have as an envelope the same body of revolution as above mentioned.

The recesses 29 thus obtained in pole piece extensions 26 may form a circular arc-shaped groove, as shown on Fig. 17, or a straight one as shown on Fig. 18.

In the case of Fig. 18, machining may be limited to the surfaces indicated by a thick line.

Figure 20:
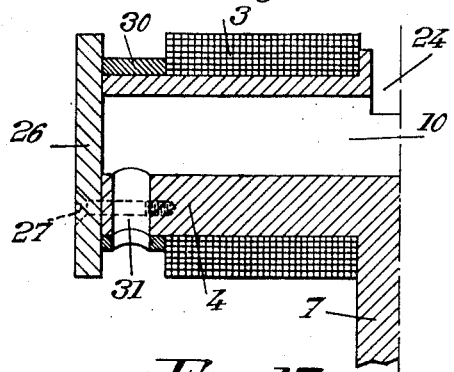
Figs. 19 and 20 are respectively an end view and an axial section of portions of stators with cores and pole pieces made according to two other modifications.

When it is desired to provide a pole piece extension on a core having a cooling conduit 10, the arrangement may be as shown by Figs. 19 and 20.

In the case of Fig. 19, pole piece extension 26 is given the shape of a U or of a horse-shoe so that the extension passes around the outlet of conduit 10.

In the case of Fig. 20, the pole piece extension 26 is fixed to a portion of core 4 extending beyond the free end of winding 3, a sleeve 30 being provided between winding 3 and said extension 26 so as to apply winding 3 against support 7. A radial hole 31 is provided in sleeve 30 and core 4 so as to connect conduit 10 with the outside.

In the construction of Figs. 24 and 25, the support of the electro-magnets is constituted by two cup-shaped members 37 and 37a provided in their centre with holes 38 and 38a; said support members are applied against each other and fixed along the edges of their holes 38 and 38a on either side of a flange 39 integral with central sleeve 5a.

Said central sleeve 5a, which is for instance obtained by molding, is advantageously provided with ribs 40 which run along the external surface of the sleeve and start from the ends thereof to said flange 39.

The cup-shaped members 37, 37a are obtained by stamping of a metal sheet and they are provided on their periphery, which is preferably of square outline, with a bent edge 41, 41a. Along the central hole 38, 38a, each of said members is provided with a plurality of holes 42, 42a for receiving cores 4.

During the above mentioned stamping operation, members 37, 37a are preferably shaped so that the portions thereof adjoining holes 38, 38a are raised so as to fit on opposite sides of flange 39 and also to form radial ribs, as shown at 43, 43a on Fig. 26, extending around holes 42 and between them.

Said cup-shaped members are then slipped on the central sleeve 5a and assembled against flange 39 by means of bolts 44 extending through said members 37, 37a and through flange 39. For this purpose, members 37, 37a are provided with holes 45, 45a and flange 39 is provided with corresponding holes 46.

The portions of members 37 and 37a in contact with each other are welded together, at least at some points of their periphery at 47.

Cores 4 are engaged in the holes 42 and 42a located opposite each other and said cores are fixed by soldering at 48 to the edges of said holes.

The stator constituted essentially by said members 37, 37a and sleeve 5a is provided with fixation means constituted by bosses 49 welded on two opposed sides of the bent edges of the cup-shaped members 37, 37a. Thus the apparatus can be secured to an element of the vehicle frame by means of bolts screwed in screw-threaded blind holes provided in said bosses 49. When two opposed edges of support 37, 37a of the apparatus are fixed to two longitudinal members of the vehicle frame, the apparatus forms a bracing between said members, which increases the rigidity of the frame.

According to a feature of the invention illustrated by Figs. 30 and 31, each end of shaft 1 includes a portion 50 of non-circular cross section adjoining a portion 51 of circular cross section, and the generatrices at the rounded apexes $S_1$, $S_2$, $S_3$ of the cross section of the non-circular part coincide with the corresponding generatrices of the cross section of the circular portion. Furthermore, the corresponding rotor disc hub 53, 53a is provided with a recess corresponding to portions of corresponding shapes as shown by Fig. 30. This facilitates the mounting of the rotor disc on the shaft. This mounting is made in two steps. During the first step, the hub 53, 53a is first slipped over the shaft so that the circular portion of the bore in said hub is in engagement with the portion 50 of non-circular section of the shaft. Thus, the disc 2 or 2a is guided and axially held on the shaft with respect to which it can still rotate freely. It is therefore possible, by suitably turning said disc, to bring the corresponding non-circular portion thereof in register with the non-circular portion of the shaft, after which the disc can be pushed so as to fit on the shaft, where it is fixed by means of a nut 23 or 23a screwed on the screw-threaded end of shaft 1.

It occurs frequently that the shaft 1 of the braking device serves also to transmit a driving torque. In this case, the ends of shaft 1 carry, fixed thereto, coupling plates 54, 54a, which are for instance fixed by means of bolts 55, 55a to the hubs 53, 53a.

In order to prevent nut 23 (23a) from being unscrewed by the vibrations of the apparatus, there is engaged on this nut 23 (23a) a plate 56 (56a) the centre of which is provided with a hole 57 (57a) having an outline corresponding at least partly to that of the nut. This plate is held in position by the above mentioned bolts 55 (55a).

Advantageously, a small portion of this plate 56 (56a) is provided close to each of the holes accommodating bolts 55 (55a) and the portion is cut and bent at right angles to form a small tongue 58 applied against one of the sides of the head of the corresponding bolt 55 (55a), so as to prevent any undesirable rotation of this bolt.

In some cases, the driving torque to be transmitted by shaft 1 may be much higher than the braking torque between discs 2 (2a) and shaft 1. As discs 2 (2a) are generally made of cast steel of a strength lower than that of shaft 1, it would be necessary, in order to transmit such a driving torque, to provide hubs 52 (52a) of great length and relatively thick.

In order to avoid this necessity, it is possible, according to another feature of the present invention, to make the hub of disc 2 (2a) distinct from the hub of the plate 59 (59a) which serves to transmit the driving torque. At least this plate 59 is secured directly through its hub 60 on shaft 1, and preferably as shown by Fig. 31, on the non-circular portion 50 thereof. The length of the portion 52 (Fig. 31) of non-circular section through which disc 2 (2a) is secured on shaft 1 can then be reduced to only that necessary for transmission of the braking torque. The hub of piece 59—60 made of high resistance steel may, as indicated by Fig. 31, be fitted in a corresponding recess extending over a sufficient length in the hub of disc 2 and the two hubs, that is to say that of plate 59 and that of disc 2, are tightly applied against each other and kept in position by the same nut 23. Advantageously, this nut is held in position by a washer 61 forming a nut brake and itself prevented from rotating by a peripheral tongue 62 which engages in a notch 63 provided for this purpose in the outer face of hub 60.

According to still another feature of the invention, the common support of the two sets of electro-magnets 3 and 3a includes two lubricating circuits extending from the periphery of this support to the central sleeve 5a thereof, so as to feed lubricant to the shaft bearings and to evacuate the excess of lubricant.

In the case, illustrated by Figs. 24, 25, where the above mentioned common support is constituted by two cup-shaped elements fixed against each other by their central portions 37, 37a, the two lubricating circuits extend between said portions 37 and 37a in a radial conduit formed by two radial ribs 64 and 64a analogous to ribs 43 and extending from sleeve 5a to the periphery of elements 37, 37a.

The inlet portion of the circuit is constituted by a tube 65 provided at its outer end with a lubricator 66 and the other end of which is coupled, for instance by screwing, with a radial conduit 67 provided in flange 39 and which forms inside the wall of central sleeve 5a two branch conduits 68, 68a parallel to the axis of said sleeve and opening, at 69, 69a in the thrust bearings 70, 70a of shaft 1. The lubricant which has flowed through these bearings from the outside toward the inside is evacuated through a conduit 71 (Figs. 26 and 29) extending through sleeve 5a and flange 39. Thus, the excess of lubricant is fed to the space between members 37, 37a and is evacuated through the space inside ribs 64, 64a which surrounds tube 65.

It should be noted that such a lubricating system can be used even when the common support, instead of being constituted by two cup-shaped elements such as 37, 37a, is a cast piece as shown on Fig. 24, conduits 65 and 71 being then provided in the mass of said support.

The bearings of shaft 1 in central sleeve 5 (or 5a) are preferably thrust bearings. For instance, as shown by Fig. 24, two opposed shoulders of shaft 1 bear against members in abutment relation with the inner races of roller bearings 70, 70a. The outer races of these roller bearings are themselves in abutment relation with rings 72, 72a closing the ends of sleeve 5a and therefore constituting walls limiting the lubricating circuit.

The portion of shaft 1 between bearings 70, 70a is relatively little heated and can therefore be placed between two thrust bearings as above stated.

Cooling of the elements of the apparatus is obtained by circulating an air stream through said apparatus along lines indicated by arrows $F_2$ and $F_2a$ (Fig. 24). Such air streams are obtained by means of rays 73, 73a extending between discs 2, 2a and their hubs and which act as fan blades on the external faces of said discs. Such an air stream enters at the outer periphery of the apparatus into the space between the common support and the internal faces of the rotor discs, exerts a cooling action on windings 3 and 3a, the internal face of discs 2 and 2a and central sleeve 5a, after which it flows out between the inner edge of each annular disc 2, 2a and its hubs 53, 53a, whence it is deviated by the centrifugal force and cools down the outer faces of the discs.

Between plates 73 which serve also as rays, a plurality of fins 74, 74a are interposed which serve to increase the fan effect and also give a larger cooling area. Advantageously, the inner ends 75, 75a of these fins pass around the inner edge of each of the annular discs and extend as far as the inner faces of said discs.

Concerning the feed of electric current to coils 3, 3a, it is advantageous to provide a plurality of coils having the same characteristics, which makes it possible to connect them either in parallel or in series in accordance with the voltage of the electric equipment of the vehicle. Thus it is possible to feed current to the same apparatus either under a voltage of 24 volts by connecting the coils in series or under a voltage of 12 volts by connecting them in parallel.

In order to facilitate connections and thus to avoid any mistake, the four angles of the common support (which is substantially square) are provided with small bars extending through said support and which constitute on every face thereof a group of several terminals which may be differentiated by different colors and to which are connected the ends, indicated by corresponding colors, of the wires of the electro-magnet windings. Every group of terminals is fitted with a cover of an insulating material 76. The input cable penetrates through a notch 77 provided in the side wall 41 of one of the cup-shaped members 37, 37a and it is connected with one of the terminal boxes arranged in the form of a double special terminal box including an insulating cover 78.

At least the coils located at the lower part of the apparatus should be surrounded by a protecting sheath made of a very rigid insulating material, for instance a polyester, so as to protect them against stones or mud which may be thrown by the displacements of the vehicle.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use to slow down the movement of rotation of a shaft, an eddy current braking apparatus which comprises, in combination, a rotor including said shaft and two metal discs parallel to each other fixed on said shaft coaxially therewith and at a distance from each other, a stator including a sleeve coaxially surrounding a portion of said shaft located between said rotor discs, bearings for said shaft mounted in said sleeve, a transverse plane fixed with respect to said sleeve and at right angles thereto being parallel to said rotor discs and located at least substantially at mid-distance between them, a support fixed on said sleeve transversely thereto on the outside thereof, the portion of said support located between said rotor discs extending to only a small distance on either side of said transverse plane, a plurality of electro-magnet cores of elongated shape having each of its longer dimension parallel to the axis of said shaft, said cores being fixed directly on said support and regularly distributed about said axis, each of said cores extending throughout said support and on opposite sides thereof to short distances from the inner faces of said rotor discs respectively, said cores being supported exclusively by said support, and a plurality of electro-magnet windings surrounding said cores, two of said windings being mounted on each of said cores, one on one side of said support and the other on the opposite side, the intervals between said windings being in free communications with the atmospheric space surrounding said apparatus, and means carried by said rotor discs for circulating cooling air streams through the spaces between said support and said discs and between said electro-magnet windings.

2. An eddy current braking apparatus according to claim 1 in which said portion of said support located between said rotor discs is constituted by two plates parallel to said transverse plane and located respectively on opposite sides thereof, said plates being rigidly assembled together.

3. For use to slow down the movement of rotation of a shaft, an eddy current braking apparatus which comprises, in combination, a rotor including said shaft and two metal discs parallel to each other fixed on said shaft coaxially therewith and at a distance from each other, a stator including a sleeve coaxially surrounding a portion of said shaft located between said rotor discs, bearings for said shaft mounted in said sleeve, a transverse plane fixed with respect to said sleeve and at right angles thereto being parallel to said rotor discs and located at least substantially at mid-distance between them, a support fixed on said sleeve transversely thereto on the outside thereof, the portion of said support located between said rotor discs being constituted by two metal plates applied and fixed against each other along said transverse plane, said plates being each provided with a central hole through which said sleeve extends, a plurality of electro-magnet cores of elongated shape having each its longer dimension parallel to the axis of said shaft, said cores being fixed directly on said support and regularly distributed about said axis, each of said cores extending throughout said support and on opposite sides thereof to short distances from the inner faces of said rotor discs respectively, said cores being supported exclusively by said support, and a plurality of electro-magnet windings surrounding said cores, two of said windings being mounted on each of said cores, one on one side of said support and the other on the opposite side, the intervals between said windings being in free communication with the atmospheric space surrounding said apparatus, and means carried by said rotor discs for circulating cooling air streams through the spaces between said support and said discs and between said electro-magnet windings.

4. An eddy current braking apparatus according to claim 3 in which said two metal plates have rectangular outlines the sides of which are greater than the external diameter of said rotor discs, the edges of said plates being bent at least substantially at right angles toward said rotor discs respectively.

5. An eddy current braking apparatus according to claim 4 in which said sleeve includes, integral therewith in its intermediate part, a flange projecting transversely from the outer wall of said sleeve, the inner edges of said plates, along said central holes thereof, being fixed to said flange.

6. An eddy current braking apparatus according to claim 1 in which said support is provided with ducts leading to and from the inside of said sleeve for circulation of lubricant in said bearings.

7. An eddy current braking apparatus according to claim 1 in which said rotor discs are annular and said cooling air circulating means comprise at least substantially radial blades integral with said annular rotor discs, on the outer faces thereof, at least some of said blades being also integral with said shaft to connect said discs with said shaft.

8. An eddy current braking apparatus according to claim 7 further comprising, on the outer face of each of said rotor discs, between the blades which connect it with said shaft, radial fins extending around the inner edge of the annular disc as far as the inner face of said disc.

9. An eddy current braking apparatus according to claim 1 in which each end portion of said shaft is in the form of a cylinder of non-circular cross section having its generatrices parallel to the axis of said shaft, the intermediate portion of said shaft, between said portions, being of circular cross section, the projection of the non-circular cross section of said shaft end portions on a plane at right angles to said axis being inscribed in the circle representing the projection on said plane of the circular cross section of said intermediate portion of said shaft, each of said rotor discs having a hub provided with a hole shaped to receive said shaft, said hole being of cylindrical shape and its portion close to the inner face of said rotor disc being of circular cross section of a diameter substantially equal to that of said shaft intermediate portion, whereas the remainder of said hole is of non-circular cross section and adapted to fit on the corresponding end portion of said shaft.

10. An eddy current braking apparatus according to claim 1 in which each end portion of said shaft is in the form of a cylinder of non-circular cross section having its generatrices parallel to the axis of said shaft, the intermediate portion of said shaft, between said portions, being of circular cross section, the projection of the non-circular cross section of said shaft end portions on a plane at right angles to said axis being inscribed in the circle representing the projection on said plane of the circular cross section of said intermediate portion of said shaft, each of said rotor discs having a hub provided with a hole shaped to receive said shaft, said hole being of cylindrical shape and its portion close to the inner face of said rotor disc being of circular cross section of a diameter substantially equal to that of said shaft intermediate portion, whereas the remainder of said hole is of non-circular cross section and adapted to fit on the corresponding end portion of said shaft, said remainder of said hole being of an axial length shorter than the axial length of the corresponding end portion of said shaft, said apparatus further comprising a coupling member to transmit a driving torque through said shaft, said coupling member including a hub provided with a hole of the same non-circular cross section as the corresponding end portion of said shaft, said hub being fitted adjacent the hub of the corresponding rotor disc on the outer side of said last mentioned hub.

11. An eddy current braking apparatus according to claim 1 in which said portion of said support located between said rotor discs is constituted by two metal plates parallel to said transverse plane and located at a short distance from each other, respectively on opposite sides of said plane, and means for rigidly assembling said two plates together at said distance from each other, said plates being provided with holes to accommodate said cores, which extend therethrough.

12. An eddy current braking apparatus according to claim 1 in which said cooling air circulating means include at least one fan having its blades rigid with said shaft, said blades being located in the annular space between said sleeve and said electro-magnet windings, said rotor being provided with passages for circulation of air between said annular space and the external space adjoining the outer faces of said rotor discs.

13. An eddy current braking apparatus according to claim 1 further comprising pole piece extensions in the form of plater applied on the ends of said cores respectively and a single screw fixing each of said pole pieces against the corresponding core, said pole piece extensions and said core ends having cooperating contact surfaces in mutual engagement, said contact surfaces being arranged to prevent said pole piece extensions from rotating with respect to said cores about said screws.

14. An eddy current braking apparatus according to claim 13 in which said cooperating surfaces are surfaces of revolution about the axis of said shaft.

15. An eddy current braking apparatus according to claim 13 in which said cooperating surfaces are, respectively, for the cores, the surface of a circular ridge of the end face of each of said cores, said circular ridges having all the same radius and their center on the axis of said shaft, and for the pole piece extensions the surface of a circular groove in each of said extensions adapted to accommodate the ridge of the corresponding core end.

16. An eddy current braking apparatus according to claim 1 in which said sleeve, said support and said cores are integral together and form a single metal unit.

References Cited in the file of this patent

UNITED STATES PATENTS

| 294,719 | Ball | Mar. 4, 1884 |
| 2,395,904 | Oetzel | Mar. 5, 1946 |
| 2,700,343 | Pezzillo | Jan. 25, 1955 |
| 2,758,231 | Welter | Aug. 7, 1956 |

FOREIGN PATENTS

| 771,976 | France | Aug. 6, 1934 |
| 495,878 | Belgium | Sept. 16, 1950 |
| 1,005,416 | France | Dec. 19, 1951 |
| 1,026,998 | France | Feb. 11, 1953 |